Aug. 22, 1961 G. H. PETERSON 2,997,325
KINETIC ENERGY ABSORBER
Original Filed Oct. 22, 1956 2 Sheets-Sheet 1
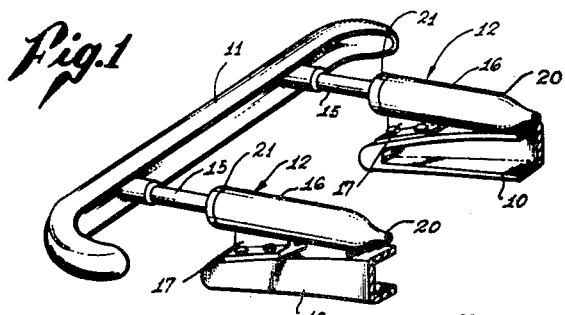
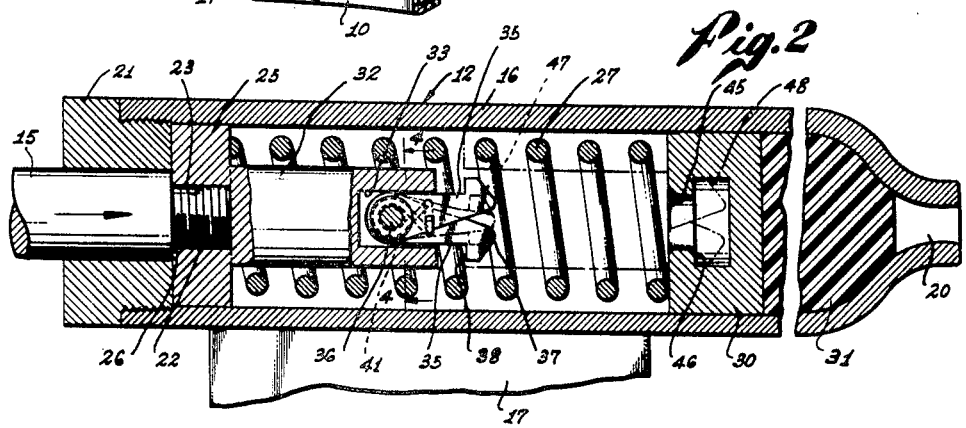
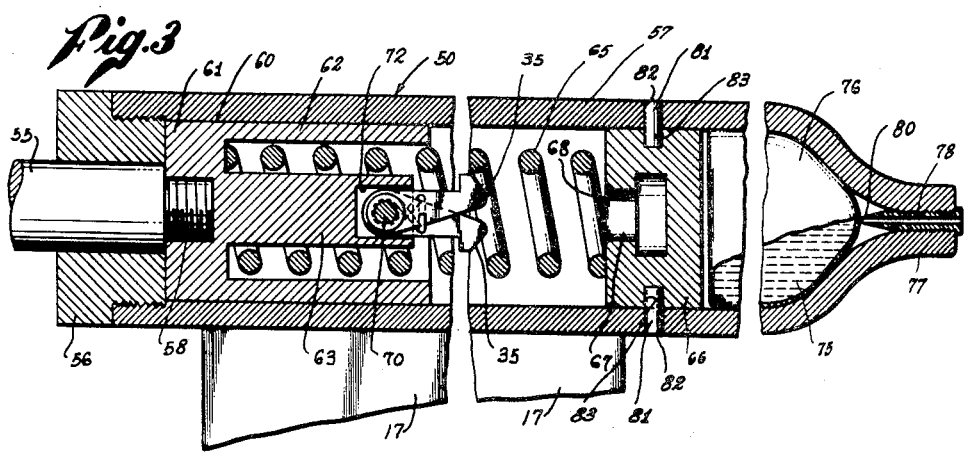
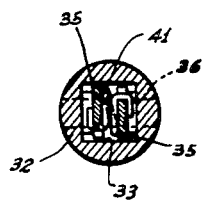
INVENTOR.

Aug. 22, 1961     G. H. PETERSON     2,997,325
KINETIC ENERGY ABSORBER
Original Filed Oct. 22, 1956     2 Sheets-Sheet 2

INVENTOR.
GERALD H. PETERSON
BY
ATTORNEYS

United States Patent Office 2,997,325
Patented Aug. 22, 1961

2,997,325
KINETIC ENERGY ABSORBER
Gerald H. Peterson, 1001 3rd St., Santa Monica, Calif.
Continuation of abandoned application Ser. No. 617,648, Oct. 22, 1956. This application Sept. 15, 1959, Ser. No. 840,201
25 Claims. (Cl. 293—1)

This invention relates to a device for and method of absorbing kinetic energy, particularly for minimizing injury and damage by collisions and is directed to a safety device of this character for use on vehicles. While the principles involved are applicable to absorption of kinetic energy in general, the invention has special utility for use on automotive vehicles and will be so described herein for the purpose of disclosure and illustration.

Of the tremendous force released in the collision of two automobiles or the crash of an automobile against a stationary obstacle, a certain portion is absorbed by destruction and deformation of the vehicle structure and the rest of the impact force is converted into deceleration of the moving vehicle. Too often the deceleration is at a rate too extreme for passengers to survive without serious injury. In like manner, a stationary vehicle struck by a speeding vehicle may be accelerated to a degree fatal for the passengers.

The general object of the invention is to provide safety means for a vehicle that is capable of absorbing a sufficiently great proportion of such collision force to reduce the consequent acceleration or deceleration of the vehicle to a magnitude that can be endured by the vehicle occupants without injury, or at least without serious injury. A further object is to minimize the destructive deformation of the vehicle structure apart from the effect on the vehicle occupants.

These objects are accomplished by an energy-absorbing device in which two members are capable of moving relative to each other in two stages in response or reaction to an impact force. In the initial stage of reaction the impact force is directed against a suitable resilient means for conversion into potential energy. If the impact force is of minor magnitude this potential energy is immediately released by recoil of the resilient means and a feature of the invention is the fact that it will serve in this manner as an ordinary shock absorber for the vehicle. On the other hand, if the impact force is of excessive magnitude the relative movement of the two parts of the safety device passes into the second stage wherein the impact force is transformed into positive work by an extrusion action or special dashpot action. In the preferred practice of the invention an automatic latch locks the resilient means against release or recoil whenever the impact force is great enough to force the relative movement of the two parts of the safety device into this second stage of reaction.

The two-stage operation of the device in reaction to an impact force spreads the impact force over an appreciable time period and thus reduces the magnitude of force that must be absorbed by the safety device at any one instant of time. The extension in time enables the safety device to absorb the major portion of the energy thereby to reduce to a safe magnitude the remaining unabsorbed portion of the impact force that is converted into acceleration or deceleration of the vehicle.

The various objects and advantages of the invention will be apparent from the following detailed description, taken with the accompanying drawings.

In the drawings, which are to be regarded as merely illustrative, FIG. 1 is a perspective view of a preferred embodiment of the invention incorporating two energy absorbing units mounted on one end of a vehicle frame;

FIG. 2 is an enlarged longitudinal sectional view of one of the energy-absorbing units shown in FIG. 1;

FIG. 3 is a view similar to FIG. 2 showing a modified form of the energy-absorbing unit;

FIG. 4 is a sectional view taken along the line 4—4 of FIG. 2;

Figure 5:
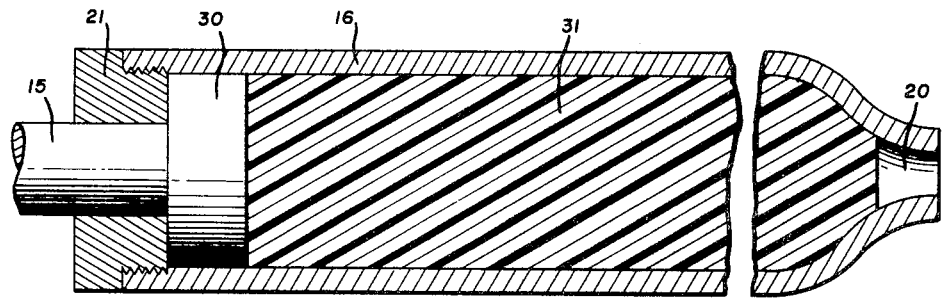
FIG. 5 is an enlarged longitudinal sectional view of another embodiment of the energy-absorbing unit of the invention showing the cylinder filled with a plastic material.

In FIG. 1, the vehicle on which the preferred embodiment of the invention is mounted is represented by the end portions of two longitudinal frame members 10 of the vehicle chassis. This particular arrangement for minimizing the effects of a collision, comprises a bumper member 11 and two energy-absorbing units, each generally designated 12, interposed between the bumper member 11 and the vehicle chassis. The two energy-absorbing units 12 comprise two plungers 15 which cooperate to support the bumper 11 and further comprise two cylinders 16 which, in turn, movably carry the plungers 15. The two cylinders 16 are mounted on the two frame members 10 respectively by suitable brackets or standards 17.

As best shown in FIG. 2, each of the cylinders 16 is of heavy metal to withstand high pressure and preferably at its rear end tapers to a discharge port or nozzle 20. The front end of each cylinder 16 may be closed by a suitable bushing 21 through which the corresponding plunger 15 slidingly extends for inward movement in response to impact forces. The inner end 22 of the plunger 15 is securely threaded into the axial bore 23 of a thrust member 25 and is of reduced diameter to form a rearwardly presented annular shoulder 26 for abutment against the face of the thrust member.

The thrust member 25 is slidingly mounted in the cylinder 16 and is normally held at the front end of the cylinder by the forward end of a suitable resilient means in the form of a heavy helical spring 27, which spring is confined, preferably under substantial compression, between the thrust member 25 and a suitable piston 30.

The interior of the cylinder 16 between the piston 30 and the discharge port or nozzle 20 contains a quantity or body of suitable material for resisting rearward movement of the piston 30. The properties of the material are such that it yields to relatively high pressure from the piston by flowing out through the nozzle 20 and in doing so offers sufficiently high resistance to the movement of the piston to absorb the major portion of any excessive impact force directed against the piston.

In the particular practice of the invention exemplified by FIG. 2, the cylinder 16 contains for this purpose a body 31 of material that is normally solid in the sense of being solid at atmospheric pressure and ordinary outdoor temperatures but is nevertheless capable of yielding to high pressure by extrusion through the nozzle 20. The yield point of the body 31 with respect to responsiveness to pressure from the piston 30 is preferably within the range of pressures created by compression of the coiled spring 27 but is near the upper end of that range so that the spring acts alone to absorb energy during the initial portion of an impact force transmitted to the plunger 15.

With the described relationships in effect it can be seen how the energy absorbing unit 12 reacts to an impact force in two stages with the spring 27 absorbing energy in the first stage of reaction and the piston 30 acting on the body 31 to absorb energy in the second stage. It can also be seen that with the yield point of the body 31 near the upper end of the range of pressures created by the spring 27 in the first stage of operation the piston 30 will begin to move as the spring 27 reaches full compression so that there is a smooth transition from the first stage of resistance by the spring 27 and the subsequent stage of operation in which the resistance to the impact force is created by extrusion of the body 31.

During the second stage of operation in which the piston 30 acting on the body 31 resists the inward movement of the plunger 15, the spring 27 may be compressed solid for transmitting pressure from the thrust member 25 to the piston 30. In the preferred practice of my invention, however, I provide the thrust member 25 with a suitable extension 32 to keep the spring 27 from being compressed solid and to serve as means to transmit thrust from the plunger 15 to the piston 30 independently of the spring 27 whenever the spring is compressed to nearly the end of its elastic limit. As shown in FIG. 2 the extension 32 may be a metal block of cylindrical configuration dimensioned to fit inside the spring 27.

A feature of the preferred practice of the invention is the concept of providing suitable means to prevent excessive recoil on the part of the spring 27. Preferably this end is achieved by an automatic latch that interconnects the thrust member 25 and the piston 30 whenever the spring 27 is compressed to a predetermined point near the upper end of its pressure range.

In the particular construction shown in FIG. 2, the end of the exenstion 32 has a large rectangular recess 33 to receive a pair of latch members or pawls 35 that are pivoted on pin 36 extending across the recess 33. Each latch member 35 has a tapered nose 37 together with an engagement shoulder 38. A suitable coiled spring 41 has its opposite ends hooked around the two latch members 35 and is wrapped around the cross pin 36 to continuously urge the two latch members 35 apart, this divergent action being limited by abutment of the two latch members against the surrounding wall of the recess 33. Thus, the two latch members are normally in the positions shown in solid lines in FIG. 2.

For cooperation with the two latch members 35 the piston 30 is provided on its forward face with a large axial bore 45 the entrance to which is preferably rounded or beveled for smooth cam action against the tapered noses 37 of the two latch members. The inner end of the bore 45 is enlarged to provide an angular shoulder 46 for engagement by the shoulders 38 of the latch members 35. It is apparent that as the extension 32 of the thrust member 25 approaches the piston 30, the tapered noses 37 of the latch members 35 contact the entrance of the axial bore 45 of the piston and by cam action the two latch members 35 contract for passage into the bore 45. The contracted positions of the two latch members 35 are shown by broken lines indicated at 47 in FIG. 2.

The operation of the impact-absorbing safety device shown in FIGS. 1 and 2, may be readily understood from the foregoing description. The initial portion of an impact force against the bumper 11 is absorbed by the springs 27 of the two energy-absorbing units 12 as the plungers 15 initially move inward to shift the thrust members 25 toward the pistons 30 in the two units 12.

Unless the impact force is of dangerously high magnitude, the rearward movement of each plunger 15 will not exceed the first stage of operation. In other words, the thrust members 25 of the two energy-absorbing units 12 will not be shifted sufficiently close to the corresponding pistons 30 to cause latching operation of the latch members 35 and each of the springs 27 remains free to recoil or expand to return the thrust members 25 to their normal forward positions in the cylinder 16. In this way the arrangement shown in FIG. 1 serves as an ordinary shock absorber or buffer means for cushioning the effect of relatively minor impact forces.

If an impact force against the bumper 11 is of dangerously excessive magnitude each of the plungers 15 of the energy-absorbing units 12 will enter its second stage of operation in which the extension 32 of the thrust member 25 contacts the piston 30 to move the piston rearward against the resistance of the body 31. As the extension 32 of the thrust member 25 approaches the piston 30 the two latch members 35 contract to enter the piston bore 45 and then under the action of the coiled spring 41 expand to the latched positions shown in broken lines at 48 in FIG. 2. The impact force then performs work by causing the piston to extrude the material of the body 31 through the discharge nozzle 20, and such extrusion absorbs a major portion of the impact force.

Whenever a plunger 15 is forced inward sufficiently to cause the thrust member 25 to be latched to the corresponding piston 30 the energy-absorbing unit is rendered inoperative with respect to its first stage of operation; and when the piston 30 is moved a substantial distance to extrude the material of the body 31 the unit is also rendered inoperative with respect to its second stage of operation. In such an event it becomes necessary to release the latch members 35 from the piston 30 and to replenish the body 31 of extrusion material.

It is contemplated that the thrust member 25 may be unlatched from the piston 30 simply by driving the cross pin 36 endwise to release the two latch members 35, the cross pin being removably mounted for this purpose in a diametrical bore that extends all the way through the extension 32 of the thrust member.

It will be apparent to those skilled in the art that various materials may be used for the body 31 that is acted upon by the piston 30 for extrusion through the nozzle 20. For example, lead or type metal may be employed, or a suitable plastic such as suitably plasticized cellulose acetate butyrate, ethyl cellulose or polyvinyl chloride acetate. Other suitably plasticized compounds may be employed, or a rubber-like elastomer such as butyl rubber.

The yield point in terms of piston pressure for a particular selected extrusion material will depend not only on the properties of the material but also on the diameter of the piston and the size and configuration of the discharge nozzle 20. Thus the smaller the diameter of the piston, the less thrust required to move the piston against the confined material for extrusion of the material, and, on the other hand, the smaller the discharge nozzle the greater the force required for extrusion. With these factors in mind it is a simple matter for a person skilled in the art to select an extrusion material for the invention and to design the springs and cylinder to carry out the desired function of absorbing an impact force by the described two-stage operation with a smooth transition from the first stage to the second stage.

In another form of the invention exemplified by FIG. 3, an energy-absorbing unit, generally designated 50, replaces each of the previously described energy-absorbing units 12. Each of the modified units 50 is of the same general construction as heretofore described including a plunger 55 that extends through a bushing 56 into a pressure cylinder 57. The inner end 58 of the plunger 55 is threaded into a thrust member 60 in the manner heretofore described but in this construction the thrust member has a heavy end-wall 61 from which extends a cylindrical wall 62 and an axial extension 63, the cylindrical wall and axial extension being preferably integral with the end wall 61. The cylindrical wall 62 and the axial extension 63 form an annular space to receive the forward end of a helical spring 65 that corresponds to and functions in the same manner as the previously described spring 27.

The rear end of the helical spring 65 presses against a piston 66 that is similar to the previously described piston and has a similar axial bore 67 leading to an annular latching or engagement shoulder 68. The previously described latch members 35 are each mounted in the usual manner on a cross pin 70 these two pins being mounted across a rectangular recess 72 in the end of the axial extension 63 of the thrust member 60.

In this modified form of the invention it is contemplated that the piston 66 will act upon a body 75 of suitable material in a sealed container 76, the container being adapted to open automatically for release of the material in response to relatively high pressure from the piston 66. The container 76, for example, may have a relatively thin wall to rupture in response to relatively high pressure and to facilitate such rupturing of the container the nozzle 77 of the cylinder 57 may be provided with a bushing 78 having an inwardly directed point 80. The point 80 is positioned to puncture the container 76 when the container is expanded towards the bushing by pressure from the piston 66.

Preferably, the piston 66 is normally anchored against movement by suitable frangible means such as a pair of pins 81 that extend through bores 82 in the wall of the cylinder 57 into corresponding blind bores 83 in the piston. The material and dimensions of the frangible pins 81 will be such that the pins will yield when the spring 65 is compressed to the point at which initial movement of the piston is desired.

The material of the body 75 in the container 76 may be normally solid if desired but the use of a sealed container makes it practical to employ a semi-liquid material such as a suitable wax or resin solution or to employ a suitable liquid such as glycerin for dashpot action.

The operation of this second form of the invention is similar to that of the first form. If an impact force is of dangerously excessive magnitude the spring 65 will be compressed during the initial portion of the impact force and then will be latched against recoil as the thrust member 60 moves against the piston 66 to break the retaining pins 81 to initiate the second stage of operation. In this second stage the piston 66 moving against the container 76 causes the container to expand towards the nozzle 77 so that the container is ruptured by the point 80 of the bushing 78. The material of the body 75 is released for discharge through the nozzle to absorb energy by a dashpot action.

It will thus be seen in accordance with my invention I have provided an arrangement which utilizes means and method steps for absorbing kinetic energy of a moving mass by first absorbing an initial part of the kinetic energy in accordance with Hooke's law, that is, in which the restoring force is proportional to the displacement, up to the point where the restoring force reaches the yield point of the plastic material, and another portion of the kinetic energy is absorbed in accordance with the laws of plastic flow by overcoming the yield point of the plastic material and extruding it out an orifice. Also, as pointed out above, preferably the means used to provide the absorption of energy in accordance with Hooke's law, when reaching the yield point of the plastic material, is locked in position or otherwise prevented from rebounding so that the absorbing system absorbs the kinetic energy without any kickback or rebound. The proportion of the kinetic energy absorbed in accordance with Hooke's law, that is, by the spring, for example, in which the restoring force is proportional to the displacement, will be preferably sufficient to avoid the usual shock resulting from an impact of a moving mass and the rest of the kinetic energy will be absorbed by plastic extrusion as described above to let the mass slow down easily. Usually in accordance with my method and device a sufficient quantity of plastic will be supplied in the device to enable it, taking into consideration the kinetic energy absorbed by the spring to absorb all the kinetic energy that it is expected will have to be absorbed to bring the moving mass to the desired velocity, including zero, that is, to a stop.

Figure 6:
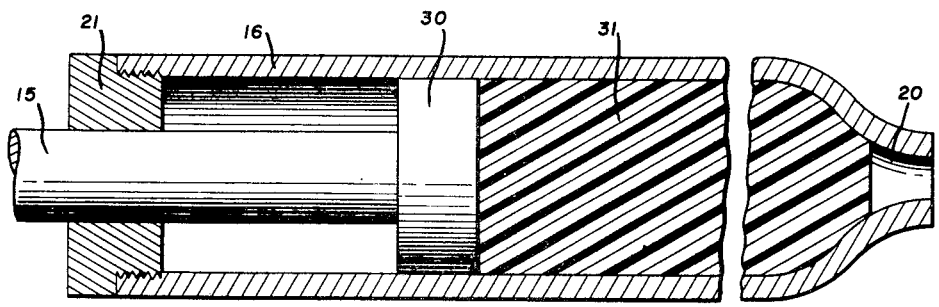
FIG. 6 is a view similar to FIG. 5 except that the plastic material in the cylinder is shown in a compressed state prior to reaching its yield point.
Figure 7:
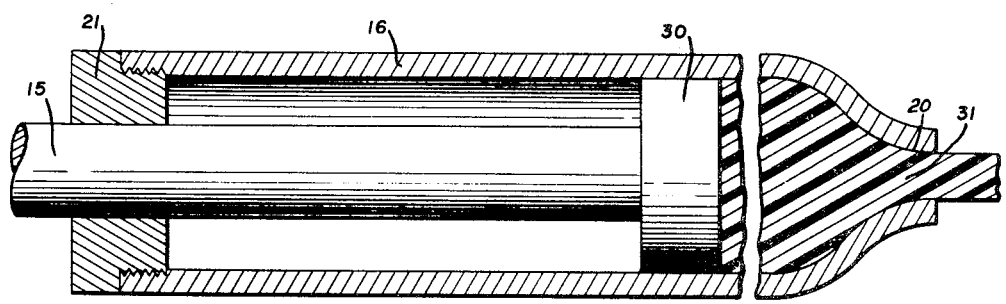
FIG. 7 is a view similar to FIG. 5 but showing the plastic material being extruded from the orifice after its yield point has been reached.

Instead of the plastic material referred to above there may also be used, in the arrangement shown in FIG. 2, a plastic material which is resiliently compressible up to the yield point at which extrusion from the orifice begins. The use of such a resiliently compressible plastic material, such as a rubber having such properties or sponge rubber, will further absorb the impact prior to the beginning extrusion through the orifice after the yield point is reached. In fact, the use of such a material which is resiliently compressible prior to the beginning of extrusion will make it possible to omit the spring 27 entirely, as illustrated in FIG. 5, and have the piston 30, which is directly connected to piston rod 15, directly in contact with such resiliently compressible plastic material, with this plastic material completely filling the cylinder 16, so that the piston first resiliently compresses the plastic material, as shown in FIG. 6, and then extrudes it out the orifice 20 after the yield point is reached in the manner illustrated in FIG. 7. With this arrangement all that is needed to absorb the kinetic energy is the piston, cylinder, resiliently compressible plastic material, and orifice. This makes a very simple arrangement for absorbing the initial impact by compressing the resilient material up to the yield point which is followed by absorption of the major portion of the kinetic energy absorbed by extrusion of this plastic material through the orifice after the yield point is reached. Furthermore, in some cases where the impact up to the yield point is not a significant factor, the spring 27 may be omitted and the piston placed to directly contact even such a plastic material as lead.

This application is a continuation-in-part of my application, Serial No. 228,847, filed May 29, 1951, and is a continuation of my copending application, Serial No. 617,648, filed October 22, 1956, both of which are now abandoned.

It will be understood that the specific embodiments of my invention described above are intended to illustrate and exemplify my invention and are not necessarily intended as a limitation thereon and that modifications of my invention may be made within the scope of the following claims which define the invention sought to be covered by Letters Patent.

I claim:

1. A shock-absorbing device to be mounted in impact-receiving position between an object and a vehicle, said device comprising a holder having an extrusion orifice, an extrudable plastic material within said holder, said plastic material being extrudable through said orifice on impact, and forcing means in contact with said extrudable plastic material for receiving the impact and transmitting the force thereof to said material to extrude said plastic material through said orifice, thereby absorbing kinetic energy of impact.

2. A shock-absorbing device to be mounted in impact-receiving position between an obstacle and a vehicle, said device comprising a holder having an extrusion orifice, an extrudable plastic material within said holder, said plastic material being extrudable through said orifice on impact, and compressing means movable within said holder for receiving the impact and transmitting the force thereof to said material to extrude said material through said orifice, thereby absorbing kinetic energy of impact.

3. A shock-absorbing device to be mounted in impact-receiving position between an obstacle and a vehicle as defined in claim 2 wherein said extrusion orifice is axially aligned in the path of said impact.

4. A shock-absorbing device to be mounted in impact-receiving position between an obstacle and a vehicle, said device comprising a cylinder having an extrusion orifice, an extrudable plastic material within said cylinder, said plastic material being extrudable through said orifice on impact, and a movable wall within said cylinder for receiving the impact and transmitting the force thereof to said material to extrude said material through said orifice, thereby absorbing kinetic energy of impact.

5. An impact absorber for a vehicle to minimize the effect of collisions, comprising: resilient means to receive and to yield in resistance to the initial portion of an impact force; a pressure chamber with a movable wall and a restricted discharge port; a mass of plastic material in said chamber capable of flow through said port under high pressure; and means to put said movable wall under pressure for discharge of said plastic material through said port in resistance to a latter portion of the impact force.

6. An impact absorber for a vehicle to minimize the effect of collisions, comprising: resilient means to receive and to yield in resistance to the initial portion of an impact force; a pressure chamber with a movable wall and a restricted discharge port; extrusion material in said chamber normally a plastic solid at atmospheric pressure; and means to put said material under pressure for extrusion through said port in resistance to said impact force after said resilient means has yielded.

7. An impact absorber as set forth in claim 6 which includes means to prevent recoil of said resilient means.

8. An impact absorber as set forth in claim 6 in which the initial yield point of said material with reference to the impact force is within the range of yield of said resilient means but near the upper end of said range.

9. An impact absorber for a vehicle to minimize the effect of collision, comprising: resilient means to receive and to yield in resistance to the initial portion of an impact force; latch means effective at a predetermined point in the yielding action of said resilient means to prevent recoil of the resilient means; and dashpot means extruding a plastic material through an orifice to resist said impact force after said resilient means yields and is latched by said latch means.

10. An impact absorber for a vehicle to minimize the effect of collisions, comprising: a cylinder having a discharge port, a plunger extending into said cylinder said plunger having a range of inward movement in response to impact force; resilient means to yieldingly resist an initial portion of said inward movement by said plunger; a normally solid plastic material in said cylinder; and a piston in said cylinder to extrude said material through said port in resistance to a subsequent portion of the impact force.

11. An impact absorber as set forth in claim 10 which includes latch means to prevent recoil of said yielding means.

12. An impact absorber as set forth in claim 11 in which said latch means operates in response to a predetermined degree of stressing of said resilient means.

13. An impact absorber for a vehicle to minimize the effect of collisions, comprising: a cylinder having a discharge port; a plastic substance confined in said chamber for flow through said port in response to relatively high pressure; a movable wall in said chamber to exert pressure against said substance; a plunger extending into said chamber for movement towards and against said movable wall in response to impact force; yielding means to resist movement of said plunger towards said movable wall; and an automatic latch to connect said plunger with said movable wall at a predetermined point in the movement of the plunger towards the movable wall thereby to prevent recoil of the yielding means against said plunger.

14. An impact absorber as set forth in claim 13 in which said plastic substance is solid at atmospheric pressure and normal ambient temperatures.

15. The method of absorbing kinetic energy of a moving mass upon impact with an object which comprises absorbing a portion of the kinetic energy by resilient means in accordance with Hooke's law in which the restoring force is proportional to the displacement up to the point of the yield point of a plastic material within a confined space, locking said resilient means against rebound when said yield point is reached and absorbing another substantially greater portion of the kinetic energy in accordance with the laws of plastic flow by extruding plastic material from said confined space through an orifice.

16. In a device for absorbing kinetic energy of a moving mass upon impact with a moving object means mounted on said mass for decelerating said mass upon impact with a moving object in accordance with a restoring force proportional to the displacement, plastic material confined within a container mounted on said mass having an extrusion orifice, and means within said container for applying said restoring force to said plastic material to cause said restoring force to overcome the yield point of and extrude said plastic material through said orifice when said force is greater than the yield point of said plastic material, and means locking said means for decelerating against rebound when said yield point is reached.

17. A device for absorbing kinetic energy of a moving mass with controlled deceleration comprising a cylinder having a piston head and an extrusion orifice for extruding plastic material, said cylinder and piston head confining a plastic material between said piston and said orifice, which plastic material will be extruded through said orifice when the yield point force of said plastic material is applied to said plastic material by said piston head, said piston head being freely movable within said cylinder in contact with said plastic material, means for decelerating said moving mass against one end of a spring having its other end in contact with said piston so that the restoring force of said spring being compressed by said moving mass is applied to said piston, latch means locking said means to said piston when said spring is compressed by said moving mass at about the yield point force of said plastic material, so that the kinetic energy of said mass is in part first absorbed by a force proportional to the displacement of one end of said spring toward said piston head up to the point where said spring exerts that force on said piston head causing said plastic material to yield to extrusion, and additional kinetic energy of said moving mass is absorbed by the extrusion of said plastic material through said orifice.

18. The method of absorbing kinetic energy of a moving mass upon impact with an object which comprises absorbing by resilient means a portion of the kinetic energy of said moving mass gradually up to the yield point of a plastic material within a confined space, and absorbing another substantially greater portion of said kinetic energy in accordance with the laws of plastic flow by extruding plastic material from said confined space through an orifice.

19. In a device for absorbing the kinetic energy of a moving mass when said mass comes in contact with another object, resilient means carried by said moving mass for gradually absorbing a portion of its kinetic energy by applying a force thereto transmitted from said object through said means, plastic material confined within a holder having an extrusion orifice, and means for applying said force to said plastic material to cause said force to overcome the yield point of and extrude said plastic material through said orifice when said force is greater than the yield point of said plastic material.

20. In a device for mounting an automobile bumper to the frame of an automobile to absorb kinetic energy upon impact of the bumper with an object, the combination comprising a cylinder mounted on said frame, said cylinder containing plastic material and having an extrusion orifice for said plastic material at one end thereof, a piston member within said cylinder and at the other end of said plastic material for forcing said plastic material to be extruded out said orifice, means for applying the force of impact on said bumper to said piston so that kinetic energy of the impact is absorbed by said force applied through said piston to said plastic material to extrude said plastic material out said orifice at a force greater than the yield point of said plastic material.

21. A device as defined in claim 20 in which said means comprises a spring between said bumper and said piston to absorb the kinetic energy of impact up to the yield point of said plastic material.

22. A device as defined in claim 21 including means for locking said spring against rebound when the yield point of said plastic is reached.

23. The method of absorbing kinetic energy of impact between an obstacle and a moving vehicle carrying a person likely to be injured by the high peak acceleration of said person relative to said vehicle resulting from a crash impact between said vehicle and said obstacle, whereby said peak acceleration of the person is reduced to a value tolerable to said person, comprising absorbing by plastic means a portion of the kinetic energy of said moving vehicle gradually up to the yield point of a plastic material within a confined space, and absorbing another substantially greater portion of said kinetic energy in accordance with the laws of plastic flow by forcing said plastic material from said confined space through an orifice when said yield point is exceeded.

24. A device for absorbing kinetic energy of impact between an obstacle and a moving vehicle carrying a person likely to be injured by the high peak acceleration of said person relative to said vehicle resulting from a crash impact between said vehicle and said obstacle comprising means for reducing said peak acceleration of the person to a value tolerable to said person, said means including a holder mounted on said vehicle and having an extrusion orifice, an extrudable plastic material within said holder, said plastic material being extrudable through said orifice and forcing means in contact with said extrudable plastic material for receiving the impact and transmitting the force thereof to said material to extrude said plastic material through said orifice, thereby absorbing kinetic energy of impact.

25. A device for absorbing kinetic energy of impact between an obstacle and a moving vehicle carrying a person likely to be injured by the high peak acceleration of said person relative to said vehicle resulting from a crash impact between said vehicle and said obstacle and reducing said peak acceleration of the person to a value tolerable to said person comprising a holder mounted in impact-receiving position between said object and said vehicle, said holder having an extrusion orifice, an extrudable plastic material within said holder, said plastic material being resiliently compressible within said holder on impact and being extrudable through said orifice when said impact exceeds the yield point of said plastic material, and forcing means in contact with said extrudable plastic material for receiving the impact and transmitting the force thereof to said material to force said plastic material through said orifice when the yield point of said plastic material is exceeded, thereby absorbing kinetic energy of impact.

References Cited in the file of this patent

UNITED STATES PATENTS

| | | |
|---|---|---|
| 575,748 | Williamson | Jan. 26, 1897 |
| 1,702,675 | Ventura | Feb. 19, 1929 |
| 1,765,200 | Bullough | June 17, 1930 |
| 1,799,894 | Fritsch | Apr. 7, 1931 |
| 1,811,152 | Seversky | June 23, 1931 |
| 1,925,461 | Ridge | Sept. 5, 1933 |
| 2,029,789 | Parks | Feb. 4, 1936 |
| 2,251,347 | Williams et al. | Aug. 5, 1941 |
| 2,553,237 | Camarero | May 15, 1951 |
| 2,562,595 | Blue | July 31, 1951 |
| 2,570,853 | Pierce | Oct. 9, 1951 |
| 2,615,373 | Pegard | Oct. 28, 1952 |
| 2,732,040 | De Vost et al. | Jan. 24, 1956 |